United States Patent [19]

Koseki et al.

[11] Patent Number: 5,446,656
[45] Date of Patent: Aug. 29, 1995

[54] METHOD OF GUIDING THE TRAVEL OF GOLF CARTS

[76] Inventors: Masamori Koseki, No. 13-15, Higashishinmachi, Itabashi-ku, Tokyo, 174; Hiroo Shoji, No. 31-5-406, Yoyogi, 5-chome, Shibuya-ku, Tokyo, 150; Ken Miura, No. 34-20, Honcho, 3-chome, Hatogaya-shi, Saitama-ken, 334, all of Japan

[21] Appl. No.: 131,598

[22] Filed: Oct. 5, 1993

[30] Foreign Application Priority Data

Feb. 8, 1993 [JP] Japan .................. 5-041730

[51] Int. Cl.⁶ .................. B62D 1/02; G05B 19/18; G05D 1/02
[52] U.S. Cl. .................. 364/424.02; 180/167; 180/168; 180/141; 318/587
[58] Field of Search .................. 364/424.02, 449, 461; 180/168, 167, 140, 141; 318/587

[56] References Cited

U.S. PATENT DOCUMENTS

| | | | |
|---|---|---|---|
| 3,668,624 | 6/1972 | Spaulding | 340/32 |
| 4,656,406 | 4/1987 | Houskamp | 318/587 |
| 4,864,207 | 9/1989 | Miura et al. | 318/587 |
| 5,000,279 | 3/1991 | Kondo et al. | 180/168 |
| 5,034,673 | 7/1991 | Shoji et al. | 318/587 |
| 5,107,946 | 4/1992 | Kamimura et al. | 180/169 |
| 5,218,542 | 6/1993 | Endo et al. | 364/424.02 |
| 5,219,036 | 6/1993 | Schwager | 364/424.02 |

FOREIGN PATENT DOCUMENTS

| | | |
|---|---|---|
| 622986 | 4/1992 | Australia . |
| 633308 | 1/1993 | Australia . |
| 2-118704 | 5/1990 | Japan . |

Primary Examiner—Kevin J. Teska
Assistant Examiner—Tan Q. Nguyen
Attorney, Agent, or Firm—Jacobson, Price, Holman & Stern

[57] ABSTRACT

A method of moving and guiding the travel of a golf cart between a plurality of marker lines by steering the cart, when sensing one marker line, toward the other marker line. A plurality of parallel lines to be sensed is formed by linearly disposing magnetic elements between the marker lines such that the extended parts of the parallel lines traverse the marker lines. An angle of the golf cart going into, or traversing, the parallel lines to be sensed by the golf cart is calculated when the golf cart, having a golf cart sensor, advances linearly and traverses the lines. The steering angle of the golf cart is altered such that the angle of the golf cart departure from the parallel lines is always at a fixed value with respect to the parallel lines.

6 Claims, 3 Drawing Sheets

METHOD OF GUIDING THE TRAVEL OF GOLF CARTS

FIELD OF THE INVENTION

This invention relates to a method of guiding carts to be traveled along golf courses.

DESCRIPTION OF THE PRIOR ART

It is known to provide unmanned carts along the golf course of a rail road type in which rails are laid on the ground and a cart runs thereon, and of a magnetic force guiding type in which magnetic elements are buried under a ground surface of a fairway to form a marker line whereby the cart runs by sensing the magnetic force on a paved road corresponding to the marker line. The rails are exposed on the fairway in the rail road type of system, and the paved road is exposed on the fairway in the magnetic force guiding type. These will result in an obstruction in playing golf, and problems will arise in the play.

In view of the above stated problems, the inventors disclosed a method of guiding traveling golf carts in Japanese Patent Laid Open No. 118704/90 whereby magnetic elements are buried under the ground surface of the fairway to form a plurality of marker lines for traveling the cart between the marker lines as well as magnetically sensing the marker lines, whereby the cart is repelled by sensing the elements and runs at random. According to this method, since it is not necessary to provide paved roads or rails on the fairway, playing is not obstructed, and the running of the carts is varied and damage to the lawn by the runnning of the cart is largely reduced.

The random running on the fairway is significant for the above stated reasons, but in some places, for example, the running or traveling on a connection route to a next hole does not require any random running of the cart. Rather the cart should be rapidly moved for the next players, and so the running on a predetermined route in the shortest distance is desirable.

These problems may be solved by suitably switching as required the runnings or traveling of the cart between the random route and the predetermined route. Therefore, the inventors have utilized, as seen in FIG. 3, a method of guiding to travel of the golf cart wherein the golf cart 4 is traveled along the marker line 3 during sensing the running marker line 3 composed of one pole (e.g., S pole), and the golf cart 4 is traveled at random as an S shape or zigzag shape as repulsing the marker line 2 during the sensing of the marker line 2 composed of the other pole (e.g., N pole).

In the above stated guiding art, the marker line of the random running area, as seen in FIG. 4, is inevitably formed by drawing curves either right or left. FIG. 4 shows the marker line 2 of the random running area when shifting from the random running area to the predetermined running area, and such areas are very often curved particularly for reasons of switching the running.

In such a systems, the random running cart 4 is directed toward the outside line of the curve (an area A in FIG. 4). Since the cart 4 cannot be rapidly steered, the cart 4 senses the marker line 2 in the random running area, runs at a certain distance along the line 2, and is steered as repulsing such sensing. Therefore, between the curved random running marker lines 2 (in FIG. 4, between the random running areas immediately before shifting to the predetermined running area), the cart 4 runs repeatedly to the marker line (part A) at the outside marker line of the curve, in particular on the marker line 2 thereof, resulting in locally damaging the lawn.

SUMMARY OF THE INVENTION

The present invention has been made in view of the above problems, and is to provides a method of guiding the travel of the golf cart, and being capable of steering so as not to concentrate the runnings or traveling on the marker line outside of the curve when the random running marker line is curved.

A method according to the present invention of guiding the travel of the golf cart between a plurality of marker lines formed by burying magnetic elements, provides for steering the cart, when sensing one marker line, toward the other marker line. A plurality of lines to be sensed is laid between the marker line and is formed by linearly disposing the lines parallel to one another and wherein the extended parts of said lines traverse the marker lines. The method provides for calculating a subsequently running direction, that is, an angle of the golf cart going into the lines to be sensed by means of the sensor mounted on the golf cart. When the golf cart having the sensing means for sensing the lines to be sensed advances linearly and traverses the lines by sensing the lines to be sensed of not less than two of said sensing means, the cart steered at a steering angle of the golf cart in response to the calculated angle of the cart going into said lines.

Figure 1:
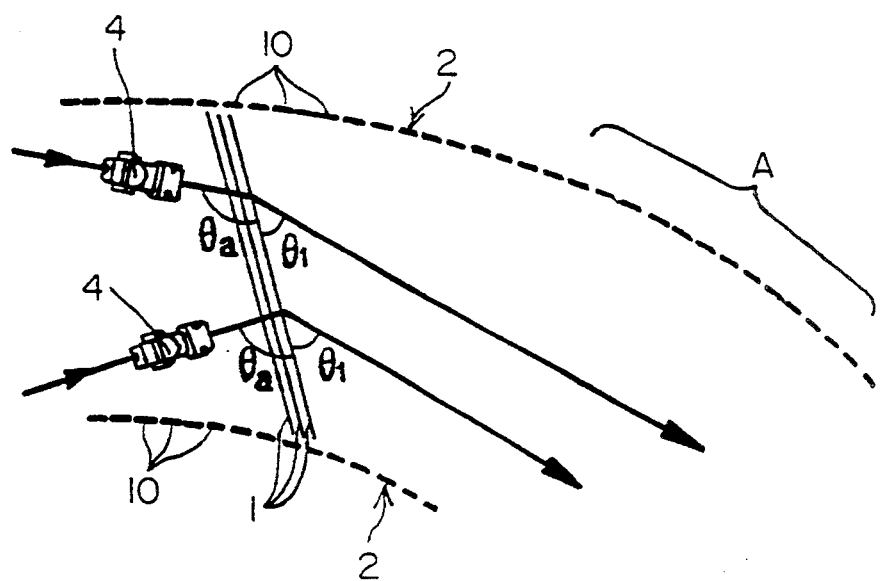
FIG. 1 is an explanatory view of the method of the present invention.

In the drawings, the reference numeral 1 designates lines to be sensed; 2 is marker lines for running on the random route; 3 is marker lines for running on the predetermined route; 4 is a golf cart; and 10 is magnetic elements.

DESCRIPTION OF THE PREFERRED EMBODIMENT

The inventive method is based on the structure set forth in the methods of guiding the travel of golf carts such as disclosed in Japanese Laid Open Patent Application No. 118704/90 where the cart 4 is steered between a plurality of marker lines formed by burying the magnetic elements 10.

In accordance with the present invention, a plurality of lines 1 to be sensed are formed by linearly disposing the lines laid between the marker lines 2 such that said lines are parallel one another and the extended parts of said-lines traverse the marker lines. The lines 1 to be sensed may be of the type which could be sensed by sensing means to be provided on the cart 4, for example, magnetic elements may be considered if the sensing means is a magnetic sensor, and the a light reflector may be considered if the sensing means is an optical sensor.

Such lines and golf cart sensors are well known in the art.

When the golf cart 4 having a means for sensing the lines 1 runs at random between the marker lines 2, it traverses the lines 1, and the sensing means of the cart 4 senses the lines 1 at this time. Since a plurality of lines 1 to be sensed are disposed in parallel, the angle $\theta a$ of the cart 4 going into the lines 1 can be calculated by the distance or time between sensing of the lines 1 disposed at a preceding predetermined order and sensing of the lines 1 disposed at a subsequent predetermined order.

The cart 4 is steered such that the steering angle after going thereinto is always $\theta a + \theta 1$ with respect to a predetermined steering angle $\Theta 1$ to the parallel lines 1.

As is seen in FIG. 1, even if the cart 4 goes into the lines at any parts of the lines 1, since the steering angle from said parallel lines 1 is always $\theta 1$ by the above stated steering, the running can be made parallel even if the following marker lines 2 are curved, the runnings of the carts are not concentrated on the marker line (area A) outside of the marker line 2 if $\theta 1$ the angle of the curve is determined to match the angle $\Theta 1$.

The actual embodiment of the invention will be explained referring to FIG. 2. It should be understood, however that the present invention is not limited to the precise embodiments described, but only as set forth in the claims.

Figure 2:
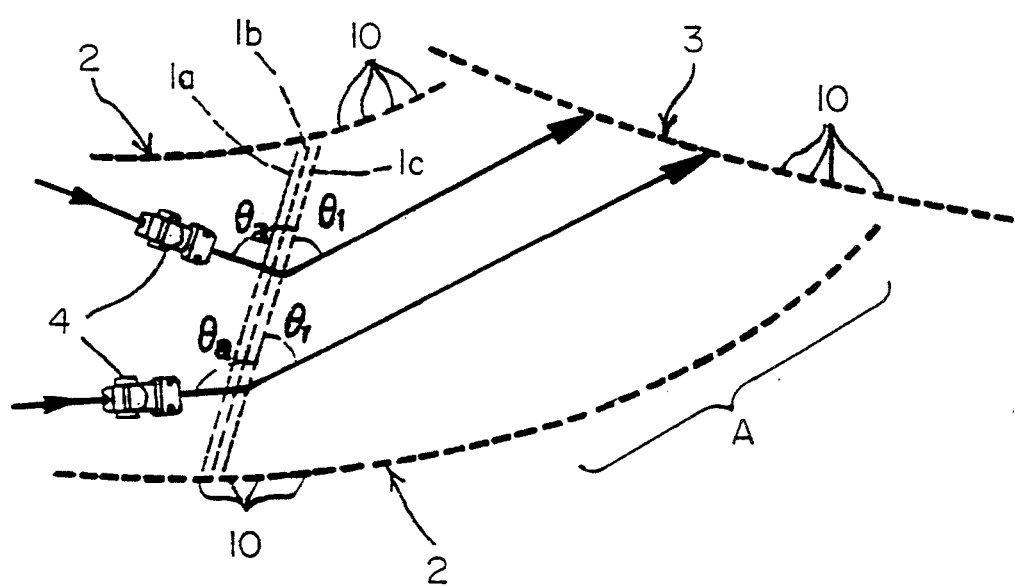
FIG. 2 is an explanatory view of one embodiment of the invention.
Figure 3:
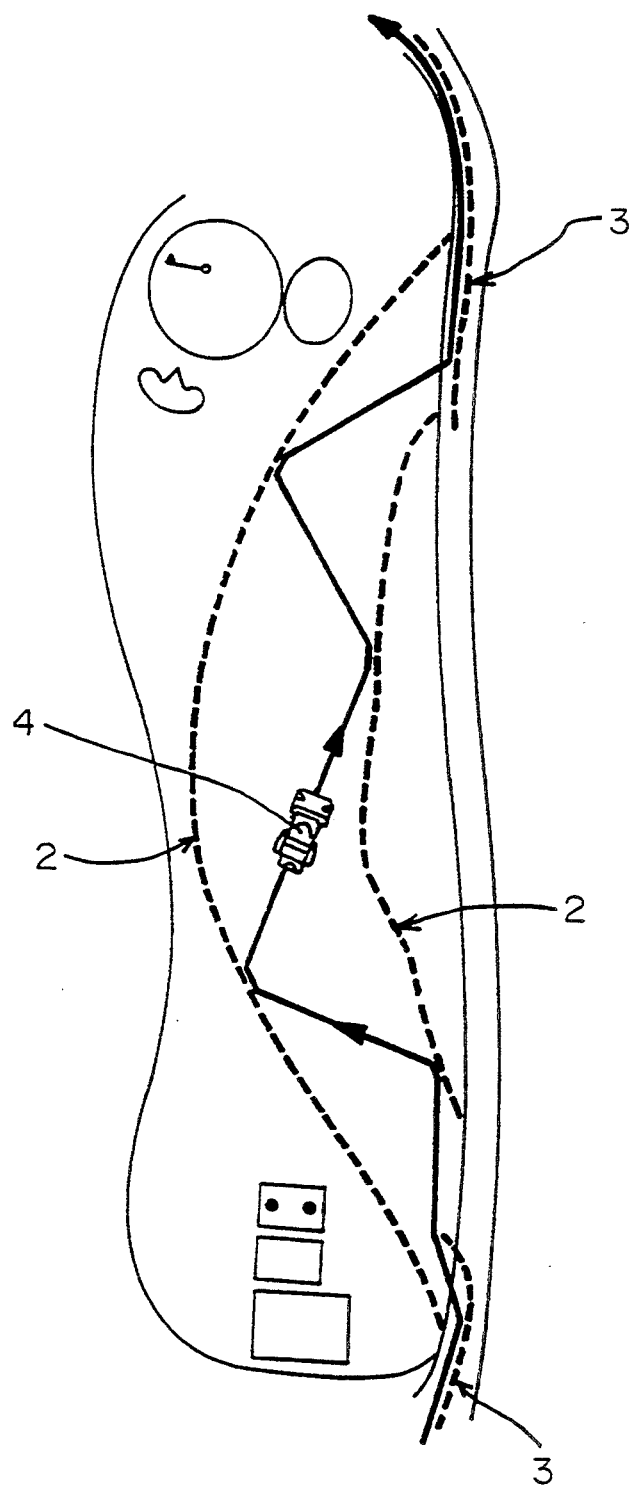
FIG. 3 is an explanatory view of the steering method to be operated together with the running on the random route and the predetermined route.
Figure 4:
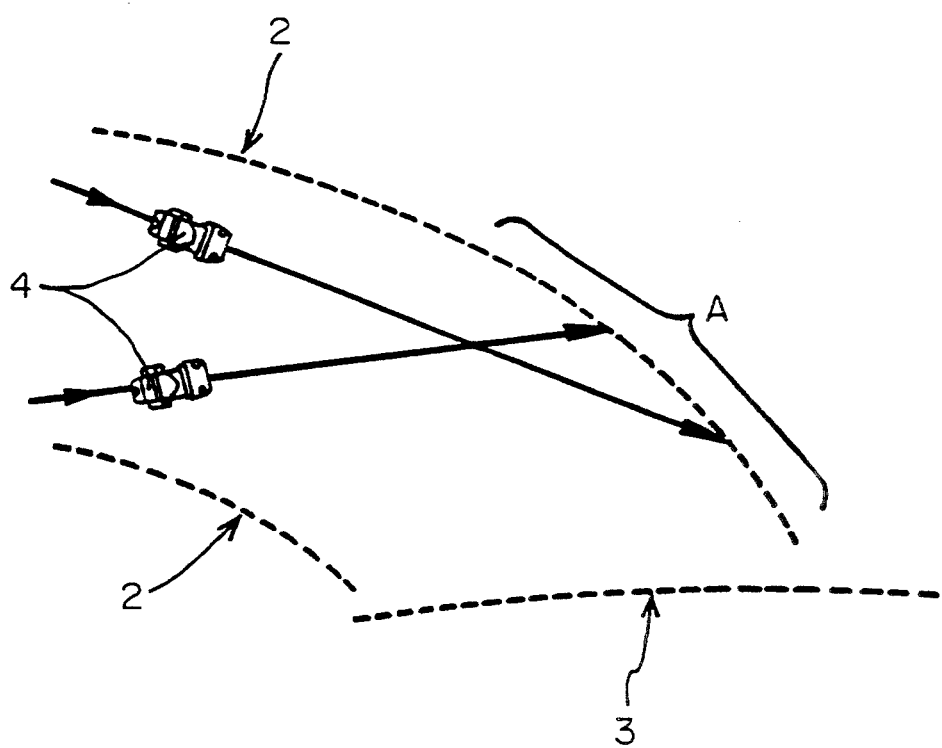
FIG. 4 is an explanatory view for explaining problems involved with the prior art.

FIG. 2 shows an example where the present invention is applied to the area where the shifting from the random running area to the predetermined running area takes place. The two random running marker lines 2 are formed by burying magnetic elements 10 of N pole in suitable depth under the ground surface. In the predetermined route, the predetermined running marker line 3 is formed by burying the magnetic elements 10 of S pole.

Under the ground surface between the random running maker lines 2, three linear lines 1a to 1c to be sensed are formed, and these lines 1a to 1c are so disposed as to be parallel each other and extended parts thereof traverse the random running maker lines 2. The lines 1a and 1c of both sides are formed by burying N pole, and the center line 1b is formed by burying the magnetic elements 10 of S pole.

On the other hand, the cart 4 is provided with a magnetic sensor (not shown) for detecting the pole of the buried magnetic element 10 and its magnetic force, and a controller (not shown) for controlling the steering of the travel based on the output issued from the magnetic sensor, these sensors and controllers are known in the art.

The controller has a pole discriminating circuit and an operational means or treatment device. When the pole discriminating circuit discriminates the pole sensed by the magnetic sensor, the running of the cart 4 is automatically selected to be any of running on the random or predetermined routes or the running by steering according to the invention. In this embodiment, as said above, the random running marker line 2 is formed with the magnetic elements 10 of N pole while the predetermined running marker line 3 is formed with the magnetic elements 10 of S pole. Thus, the cart 4 is so steered as to run on the random route if the pole discriminating circuit continuously discriminates the N pole, and run on the predetermined route if it goes on to discriminate the S pole.

On the other hand, when said circuit reads the predetermined pole arrangement, the cart is controlled by steering according to this invention. That is, in this embodiment, the lines 1a to 1c to be sensed are buried in parallel, and the poles thereof are in order of "N S N". When this pole arrangement is sensed, the advancing direction toward the predetermined angle $\Theta 1$ is calculated with respect to line 1b to 1c which are sensed by the cart 4 after passing the line 1a in regard to the distance or time of sensing between the line positioned at the preceding predetermined order and the line positioned at the subsequent predetermined order (herein from the 1st line 1a to the 3rd line 1c) by means of the operational treatment device. The cart 4 is so steered that the steering angle $\theta 1$ is always constant to the parallel lines 1a to 1c to be sensed, in other words, the steering angle after the cart has entered is always to be $\theta a + \theta 1$. In this case, the $\theta 1$ is set to be about 45° with respect to the lines 1 taking into consideration the curve of the random running marker lines 2. The number of the lines and the pole arrangement may be any arrangement such as, for example, "S N S", "S N", etc.

The random running of the cart 4 employs the technique of Japanese Patent Laid Open No. 118704/90 described above, and the detailed description thereof will be omitted. With respect to the running on the predetermined route, the magnetic sensors are provided right and left of the cart 4, and the cart is so steered that the detected magnetic forces of the sensors are just on the predetermined route running marker line 3.

A cart running example will now be explained.

When the golf cart 4 advances at random between the random routes 2, it crosses the lines 1a to 1c before the curved part, and then the sensing means of the cart 4 senses said lines. Since the lines to be sensed are three disposed in parallel, the cart 4 is so steered by the controller that the steering angle is always about 45° to the parallel lines 1a to 1c due to the distance or the time from the detection of the first line 1a to the detection of the third line 1c, that is, the steering angle of the cart 4 after entering is always $\theta a + 45°$. Therefore, as shown in FIG. 2, even if the cart 4 goes into at any part of the lines 1a to 1c, the running of the cart 4 from the lines 1a to 1c is steered at about 45° from the parallel lines 1a to 1c, and so the cart does not run repeatedly on the marker line (area A) outside the curved part, but directs itself to the predetermined route running marker line 3.

This invention can be applied to guiding of unmanned carts along a golf course, and can also be applied to any unmanned carts to be used for industrial applications such as carts in factories.

What is claimed is:

1. An improved method of moving and guiding the travel along a golf course of golf carts equipped with cart sensing means for sensing elements of a marker line, operational means for determining angular orientation of the golf cart, and steering means for altering the steering angle of the golf cart, wherein the golf cart is movable in at least one of a serpentine and zig-zag orientation between at least two marker lines, from one marker line to the other marker line, each marker line formed by burying elements detectable by the cart sensing means on or under the golf course ground surface, wherein the improved method comprises the steps of:

(a) laying a plurality of parallel lines formed of elements detectable by the golf cart sensing means between the at least two marker lines such that an extension of said parallel lines traverse said marker lines, said parallel lines being disposed such that a golf cart traverses said parallel lines during movement between one marker line toward the other marker line;

(b) sensing a golf cart traversal of at least a pair of said parallel lines;

(c) steering the golf cart, following the sensing of the golf cart traversal of the last of said plurality of parallel lines, at a predetermined angle of departure with respect to said parallel lines.

2. The method of claim 1 wherein the cart sensing means includes a means for sensing magnetic elements, and wherein said laying step comprises the laying of magnetic elements.

3. The method of claim 2 wherein said steering step includes the step of calculating an angle of turning of the golf cart so as to enable the golf cart to be steered at said predetermined angle of departure with respect to said parallel lines.

4. The method of claim 3 wherein said step of calculating includes determining the angle of traversal, with respect to said parallel lines, that a golf cart has traversed at least a pair of said parallel lines and adding the value of the determined angle of traversal to the predetermined angle of departure.

5. The method of claim 4 wherein said determining step comprises determining the amount of time the golf cart took to traverse at least a pair of said parallel lines.

6. The method of claim 4 wherein said determining step comprises determining the distance the golf cart traveled across at least a pair of said parallel lines.

* * * * *